(12) United States Patent
Scott (10) Patent No.: US 8,191,580 B2
(45) Date of Patent: Jun. 5, 2012

(54) METHOD OF LINING PRE-EXISTING PIPES OR PASSAGES AND APPARATUS THEREFOR

(75) Inventor: Kenneth Latimer Scott, Cornwall (GB)

(73) Assignees: Sekisui Chemical Co., Ltd., Osaka (JP); Toa Grout Kogyo Co., Ltd., Tokyo (JP)

( * ) Notice: Subject to any disclaimer, the term of this patent is extended or adjusted under 35 U.S.C. 154(b) by 473 days.

(21) Appl. No.: 12/442,103

(22) PCT Filed: Oct. 23, 2007

(86) PCT No.: PCT/GB2007/004062
§ 371 (c)(1),
(2), (4) Date: Mar. 19, 2009

(87) PCT Pub. No.: WO2008/050121
PCT Pub. Date: May 2, 2008

(65) Prior Publication Data
US 2009/0293979 A1  Dec. 3, 2009

(30) Foreign Application Priority Data
Oct. 24, 2006 (GB) .................................. 0621090.0

(51) Int. Cl.
*F16L 55/18* (2006.01)

(52) U.S. Cl. ......... 138/98; 138/97; 138/120; 405/150.1; 405/152; 405/184.2

(58) Field of Classification Search ............. 138/97, 138/98, 120; 405/184.2, 152, 150.1
See application file for complete search history.

(56) References Cited

U.S. PATENT DOCUMENTS

| | | | | |
|---|---|---|---|---|
| 1,938,829 A | * | 12/1933 | Hamer | 285/112 |
| 2,823,703 A | * | 2/1958 | Nusser, Jr. | 285/181 |
| 3,443,758 A | * | 5/1969 | Kopp et al. | 239/265.35 |
| 3,602,263 A | | 8/1971 | Bremner | |
| 3,645,102 A | * | 2/1972 | Chlumecky | 405/146 |
| 4,598,427 A | * | 7/1986 | Vykukal | 2/2.12 |
| 4,776,370 A | | 10/1988 | Long, Jr. | |
| 4,807,370 A | * | 2/1989 | Trimble | 33/529 |
| 5,660,912 A | * | 8/1997 | Menzel | 428/99 |
| 7,390,143 B1 | * | 6/2008 | Tenbusch, II | 405/184.3 |

FOREIGN PATENT DOCUMENTS

| WO | WO-92/19901 A1 | 11/1992 |
|---|---|---|
| WO | WO-2006/136794 A1 | 12/2006 |

OTHER PUBLICATIONS

International Search Report for the Application No. PCT/GB2007/004062 mailed Jun. 5, 2008.

* cited by examiner

*Primary Examiner* — James Hook
(74) *Attorney, Agent, or Firm* — Cheng Law Group, PLLC (57) ABSTRACT

A method and apparatus for lining a pre-existing pipe or passage having at least one curved section or bend along its length with a pipe assembly (10) is disclosed. An assembly is formed from a plurality of pipe sections (11), having axial ends (15,16) which are inclined at non-orthogonal angles (x) with respect to the longitudinal axis of the sections, and having interengagement means, placed end-to-end and engaged together. The pipe assembly is advanced into the passage or pre-existing pipe, pipe sections being vibrated such that the relevant pipe sections rotate relative to one another towards a relative orientation in which the axes of adjacent pipe sections within a curved section of pre-existing pipe or passage lie inclined at an angle to one another such that the pipe assembly can be advanced through the pre-existing pipe or passage.

17 Claims, 10 Drawing Sheets

METHOD OF LINING PRE-EXISTING PIPES OR PASSAGES AND APPARATUS THEREFOR

The present invention relates to a method of lining pre-existing pipes or passages and apparatus therefor.

Traditionally, pipes for conveying fluids have been made in lengths or sections each provided with means at the ends for joining the pipe sections to adjacent such pipe sections. Various techniques have been used to achieve this objective. For example, steel or cast iron pipes are conventionally provided with radial flanges at each end, each having a plurality of holes in a circumferential array around the pipe mouth, which flanges are placed face-to-face and bolted or riveted together to join two adjacent pipe sections. In more recent times metal pipes have been joined by welding and plastics pipes by solvent welding. For this latter purpose it is usual for the pipes to have sleeves or collars surrounding the outside to provide an added area of face-to-face contact for the solvent to provide an adequate fluid-tight seal. Land drains, traditionally made of clay, have been provided with an enlarged end portion the interior diameter of which matches the exterior diameter of the main length of the pipe so that an end of the main length can be fitted into the enlarged portion. Cementitious material is then used in the space to seal the junction against the escape of fluids carried by the pipeline.

All of these pipe section connection techniques have one feature in common, namely that they secure the pipe sections together firmly, sometimes providing a fluid-tight seal, but always forming a junction which does not allow adjacent pipe sections to move in relation to one another, especially not to rotate about their respective longitudinal axes.

These pipes are almost always buried in the ground and accordingly it is difficult to access them to undertake repairs from wear and tear and damage caused by tree roots and/or traffic.

The drainage systems in many urban areas now have an extensive requirement for reinstatement. The cost of excavating along the line of a drainage pipe to form a trench allowing replacement pipe to be installed in the same way as the original pipe was installed is, however, extremely expensive, time consuming and disruptive, especially when the pipes have been laid along roadways. One way in which reinstatement of failed pipes has been achieved without the need for extensive trench digging involves the formation of successive spaced pits along the length of a failed pipeline, and the introduction of a pipe liner into the interior of the pre-existing pipe, by drawing or pushing a fresh pipe, usually made of a plastics material, into the pre-existing pipe. This technique has a number of advantages, the most significant of which is the avoidance of extensive trench digging and the consequent disruption, but also certain limitations. The distance between successive pits has to be relatively small because of the frictional forces involved in forcing a liner into the interior of the pre-existing pipe, and this is exacerbated if there is even the slightest curve or bend in the pipe. In some circumstances, however, there are quite significant bends in pipes and until now the only way in which reinstatement could be achieved was by complete excavation of the area of the bend and replacement of the faulty pipe.

With known types of pipe assemblies, where the sections are connected by such techniques as discussed above, the assembly has an externally radial (with respect to the longitudinal axis of the section) surface which is not smooth but rather has radially extending joint portions. These make it difficult to insert an assembly of pipe sections into a pre-existing pipe or passage as they increase friction between the internal surface of the pre-existing pipe or passage and the external surface of the pipe assembly. Further, they can cause snagging of the pipe assembly within the lumen as it is advanced along the length of the pre-existing pipe or passage.

The present invention seeks to provide a novel means by which at least some of the above-identified problems can be resolved or at least mitigated.

According to a first aspect of the present invention, there is provided a method of lining a pre-existing pipe or passage having at least one curved section or bend along its length with a pipe assembly, in which the assembly is formed from a plurality of pipe sections, having axial ends which are inclined at non-orthogonal angles with respect to the longitudinal axis of the sections, and having interengagement means, placed end-to-end and engaged together, and wherein the pipe assembly is advanced into the passage or pre-existing pipe, pipe sections being vibrated such that the relevant pipe sections rotate relative to one another towards a relative orientation in which the axes of adjacent pipe sections within a curved section of pre-existing pipe or passage lie inclined at an angle to one another such that the pipe assembly can be advanced through the pre-existing pipe or passage.

The axial ends may be inclined at non-orthogonal angles (in the range 45 to 90 degrees) with respect to the longitudinal axis of the sections, such that two adjacent sections may form either a straight or a non-straight portion when rotationally oriented relative to one another. The angle between the longitudinal axes of two adjacent sections may lie in the range 90° to 0°.

In embodiments, a section of the pipe assembly may be vibrated in a direction substantially parallel to its longitudinal axis. This may be the lead section, alternatively or additionally it may be the trailing section (i.e. the last section in the assembly, at the opposite end from the lead section), and/or any other section in the assembly.

In embodiments, this vibration may cause adjacent sections of the pipe assembly to move axially towards and away from one another. This relative movement between adjacent sections assists in allowing the sections of pipe to rotate relative to one another so that the pipe assembly may be advanced through the pre-existing pipe or passage such that it follows its longitudinal axis along bends, or curved portions, as well as straight portions.

In embodiments, the pipe assembly may be advanced through the pre-existing pipe or passage by means of a traction or tension force. This may be achieved by having a line such as a rope, chain, cable or other such flexible elongate member attached to the pipe assembly. The line may be attached to the lead section, the trailing section or any other section therebetween. In use, the line may be first inserted into the pre-existing pipe or passage at one end and drawn through to the other end. It is then attached to a section of the pipe assembly and the assembly is inserted into the pre-existing pipe or passage and pulled through by means of the line.

Alternatively, or additionally, in embodiments, the pipe assembly may be advanced through the pre-existing pipe or passage by means of a pushing force. The pushing force may be applied at the trailing end of the assembly, and/or at any other point along the length of the assembly. Such force may be supplied by well known means such as hydraulic rams.

In embodiments, the advancement of the pipe is achieved by the vibration. In this arrangement, no further external assistance such as the line or rams mentioned above need be provided. Instead, the action of the vibration imparts sufficient longitudinal thrust to advance the pipe sections through the pre-existing pipe or passage.

According to a second aspect of the present invention, there is provided a pipe lining apparatus for use in lining a preexisting pipe or passage having at least one curved section or bend along its length, comprising pipe sections having generally cylindrical walls having axial ends which are inclined at non-orthogonal angles with respect to the longitudinal axis thereof, and interengagement means provided at each axial end by which adjacent sections can be joined together, into a pipe assembly, and held against axial separation while allowing relative rotation therebetween about the respective longitudinal axes; means for vibrating at least one pipe section so that, in use, relative rotation of the pipe sections with respect to one another about their respective longitudinal axes is facilitated; and means for applying either a tensile or compressive force to the pipe assembly for advancing the assembly through the pre-existing pipe or passage.

The axial ends may be inclined at non-orthogonal angles (in the range greater than 45° to less than 90°) with respect to the longitudinal axis of the sections, such that two adjacent sections may lie with their axes aligned in a straight line or inclined at an angle to one another when rotationally oriented relative to one another. The angle between the longitudinal axes of two adjacent sections may lie in the range 0° to 90°.

In embodiments, the interengagement means may be shaped to snap-engage and retain the said adjacent pipe sections together by the resilience of the material of which the snap-engagement means are made. The interengagement means may be integrally formed as part of the body of each pipe section, and further may be formed within the wall thickness of the pipe section itself, such that upon assembly the radially exterior surface is smooth with no radial projections at the junctions of adjacent pipe sections.

In order to form pipe sections which may be oriented to form a rectilinear or a curved pipe assembly, in embodiments, the opposite ends of each pipe section may be inclined in the same direction with respect to the longitudinal axis of the pipe section. Alternatively, the opposite ends of each pipe section may be inclined in opposite directions with respect to the longitudinal axis of the pipe section.

Another possibility is that, in embodiments, the opposite ends of each pipe section may be inclined at the same angle (magnitude only) with respect to the longitudinal axis of the section, but oriented differently about this axis.

In embodiments, the interengagement means may comprise an annular groove or channel in one end of each pipe section and an annular bead or ridge at the other end, the groove or channel having a re-entrant form and the bead or ridge being joined to the body of the pipe section by an annular wall portion of lesser thickness than either the bead or ridge or the wall of the body of the pipe section, the groove or channel itself having a recess for receiving a sealing element. This may be expressed as a narrowing or neck in cross section.

In embodiments, grooves could be provided at both ends of some sections and annular beads could be provided at both ends of other sections so that, in order to produce a length of pipe assembly, one of each type must be placed alternately together.

In embodiments, this sealing element may be a compressible bead, strip or ring engageable in the said recess.

In embodiments, the cross sectional shape of the groove or channel, like that of the bead or ridge, may be asymmetric whereby to exert a constant resilient force once snap-engagement has taken place.

In embodiments, the body of each pipe section may be injection moulded from plastics material.

In embodiments, the means for vibrating and the means for applying comprises a terminator coupled with a conduit operable to carry a fluid, the conduit being intermittently pressurised by the fluid and the terminator having vents operable to release the intermittently pressurised fluid in the direction of the longitudinal axis of the pipe sections. The release of the intermittently pressurised fluid imparts a longitudinal force on the terminator. This force both vibrates and advances the pipe assembly through pre-existing pipe or passage.

In embodiments, the pipe sections comprise a leading pipe section and trailing pipe sections, the leading pipe section advancing through the pre-existing pipe or passage, with the trailing pipe sections following, the means for vibrating and the means for applying being engagable with the leading pipe section to pull the pipe sections through the pre-existing pipe or passage. By engaging with the leading pipe section, the longitudinal force exerted by the terminator pulls the leading pipe section and the trailing pipe sections through the pre-existing pipe or passage.

In embodiments, the conduit is rotatable and the means for vibrating and the means for applying comprises a plurality of discs, each disc being coupled with the conduit and each disc being engagable with a predetermined one of the trailing pipe sections to impart rotation of the conduit to that trailing pipe section. Rotating the conduit causes each disc to rotate which, in turn, causes that individual pipe section to turn. This enables a rotation force to be applied at points along the length of the pipe sections, which assists the advancement of the pipe sections through the pre-existing pipe or passage to a greater degree than would otherwise be possible through vibration of the leading pipe section alone.

In embodiments, the conduit is coupled with each disc via a safety clutch, the safety clutch being operable to disengage rotation of the conduit from the trailing pipe section when greater than a predetermined resistance to the rotation of that trailing pipe section is encountered. Accordingly, should one or more trailing pipe sections snag and become temporarily unrotatable, then rotation of the conduit is not prevented and other trailing pipe sections may still be rotated to facilitate advancement of the pipe sections through the pre-existing pipe or passage.

Various embodiments of the present invention will now be more particularly described, by way of example, with reference to the accompanying drawings, in which.

Figure 1:
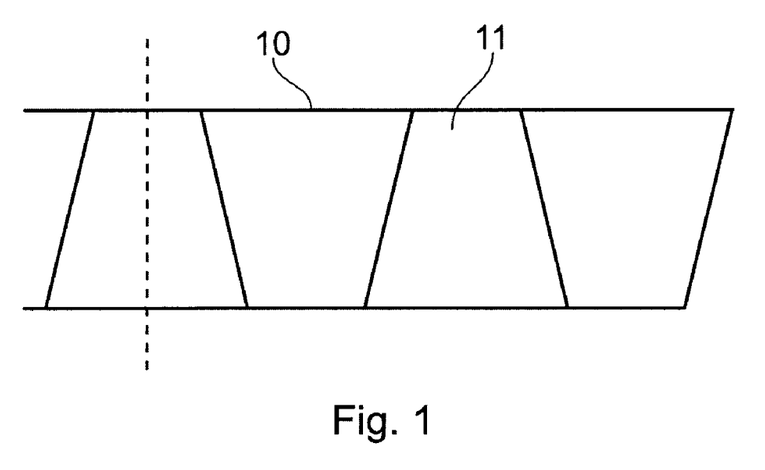
FIG. 1 is a schematic side view of a first embodiment of the invention.
Figure 2:
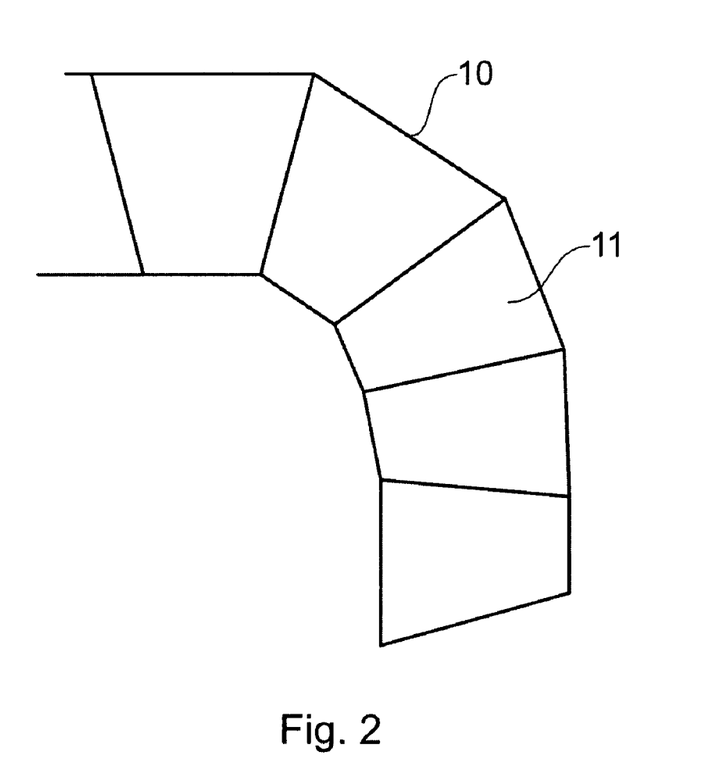
FIG. 2 is a schematic side view of the embodiment of FIG. 1 illustrating it in a different configuration.
Figure 3:
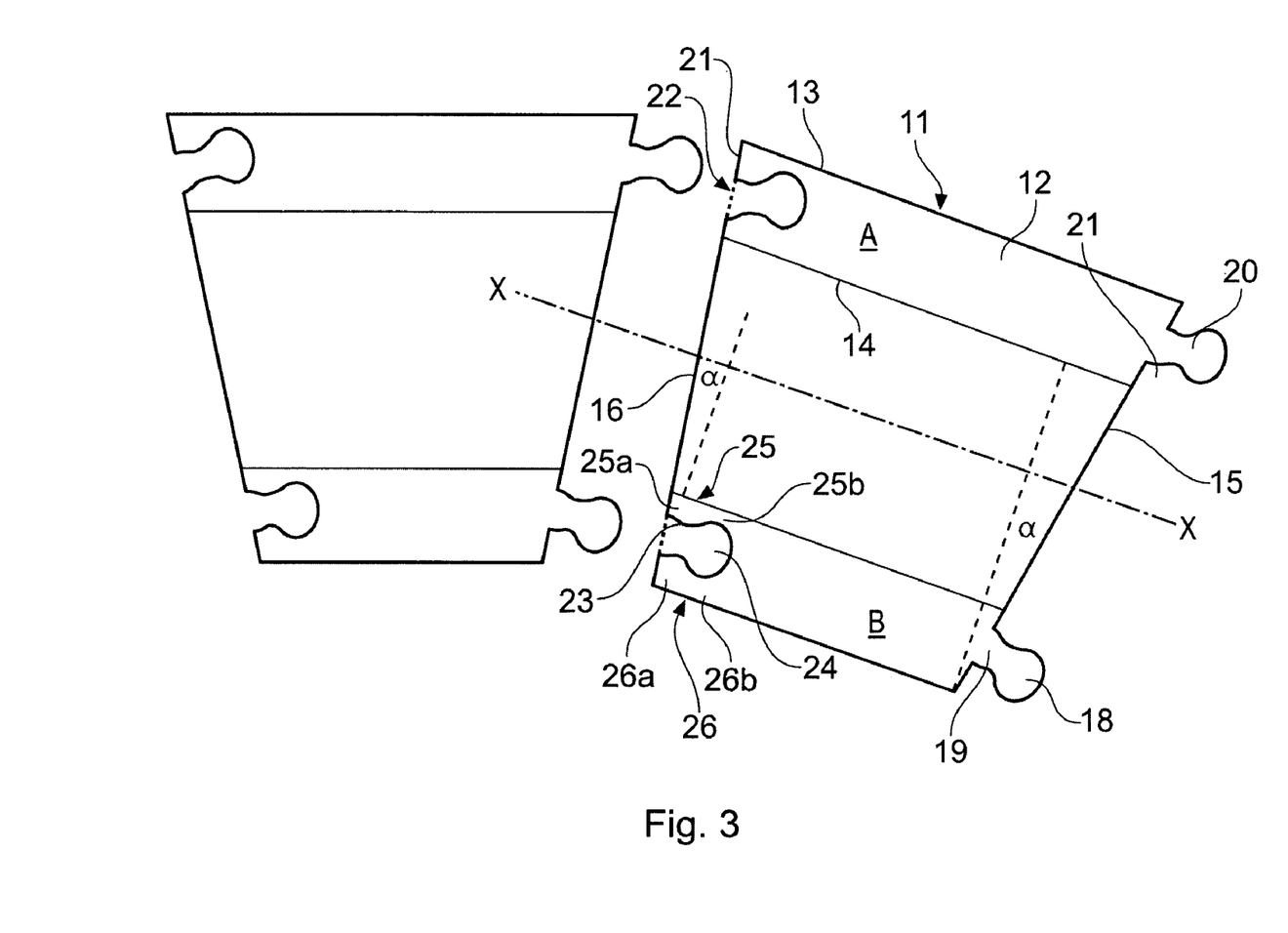
FIG. 3 is a similar enlarged sectional view of a part of the embodiment of FIGS. 1 and 2.

Referring first to FIGS. 1, 2 and 3, there is shown a pipe assembly generally indicated 10 comprising a plurality of identical pipe sections 11 which are shown in more detail in FIG. 3. Each pipe section 11 comprises a generally cylindrical wall 12 having smooth inner and outer cylindrical surfaces 13, 14 respectively. The pipe section 11 has two opposite ends 15, 16 each of which is generally planar and inclined at an angle α to the radial plane orthogonal to the axis X-X of the cylindrical wall 12. The angle α may typically be in the region of 3 to 5 degrees, but may be larger than this for special purposes. Each of the end walls 15, 16 is inclined oppositely from the other with respect to the radial plane orthogonal to the axis. This forms a trapezoidal outline in axial section as can be seen in FIG. 3.

FIG. 1 shows an assembly of such sections each adjacent section being oriented with its inclined end walls 15, 16 turned to face in the opposite direction from that of the next adjacent section so that, as can be seen in FIG. 1, the overall pipe assembly 10 is generally rectilinear.

The end wall 15 of the pipe section 11 has a circumferential ridge 17 which, in cross section, has a generally circular mushroom head 18 with a neck portion 19 formed by two undercut sides 20, 21. As can be seen in FIG. 3 the mushroom head 18 is asymmetric, with a bias towards the radially outer part of the pipe section 11.

The opposite end 16 of the pipe section 11 is correspondingly and oppositely inclined to the radial plane orthogonal to the axis X-X, by the same angle α as the inclination of the end 15, and in its end face 21 there is formed a circumferential groove 22 having a narrow neck 23 and an enlarged fundus 24. The shape of the circumferential groove 22 substantially matches the cross sectional shape of the ridge 17 in the opposite end of the pipe section 11.

The neck 23 of the groove 22 is, effectively, formed by two narrow wall portions 25, 26 which themselves have a wider end 25a and a narrower neck portion 26a and 25b, 26b capable of resiliently flexing so that, in order to join two pipe sections 11 end-to-end it is simply necessary to place the ridge 17 at the entrance or neck portion 23 of the groove 22, and to exert an axial force urging the two pipe sections together, in which case the resiliently flexible narrow neck portions 25b, 26b of the walls 25, 26 allow these to flex outwardly to permit the mushroom head 18 of the ridge 17 to enter the fundus 24 of the groove 22. Once snap-engaged together the two pipe sections are held securely, but relative rotation about the axis X-X can take place providing sufficient force is applied to overcome the frictional resistance of the circumferential engagement of the ridge 17 and the groove 22.

It will be appreciated that a pipe section 11 such as that illustrated in FIGS. 1 to 3 has a relatively longer circumferential sector exemplified by the wall section A of FIG. 3, and a relatively shorter circumferential sector exemplified by the wall section B of FIG. 3. When adjacent pipe sections are positioned with their respective circumferential sectors A, B in register, as shown in FIG. 3, the axis X-X of each adjacent pipe section is inclined by an angle 2α with respect to the axis X-X of the adjacent pipe section. However, if the respective circumferential sectors A, B are placed opposite one another such that in adjacent pipe sections the long circumferential sector A is in register with the short circumferential sector B of the adjacent pipe section 11, then the pipe assembly adopts a rectilinear configuration as illustrated in FIG. 1.

Figure 4:
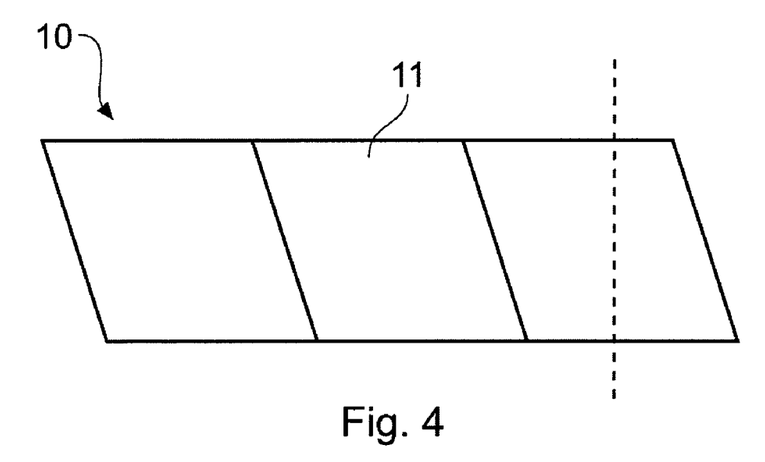
FIG. 4 is a similar schematic side view of a second embodiment of the invention.
Figure 5:
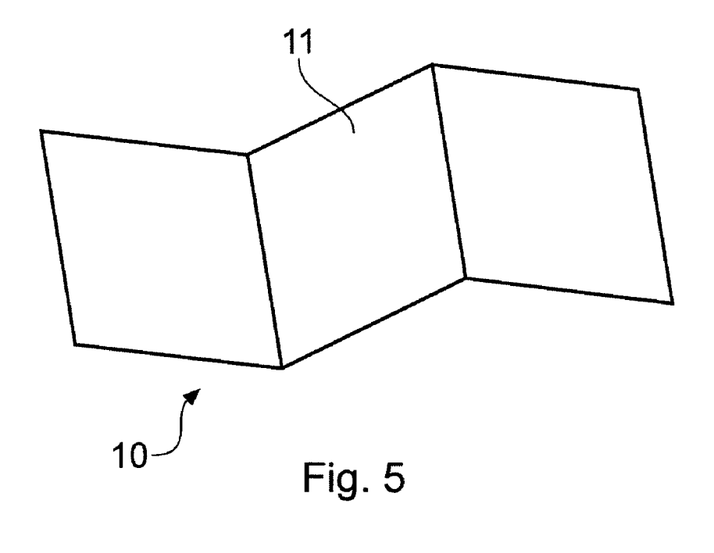
FIG. 5 is a schematic side view of the embodiment of FIG. 4 showing it in a second configuration.

FIGS. 4 and 5 illustrate an alternative arrangement in which, rather than opposite end walls being oppositely inclined with respect to a radial plane, the opposite end walls are inclined at the same angle with respect to a radial plane and in the same direction. In axial section, therefore, the pipe sections have a parallelogram shape rather than a trapezium shape as in the embodiment of FIGS. 1 to 3, but like the embodiment of FIGS. 1 to 3, when the adjacent pipe sections are turned about their respective axes they may be positioned to adopt a rectilinear configuration as shown in FIG. 4 with all the inclined faces lying in parallel planes, or a curved configuration as shown in FIG. 5. This embodiment, however, only allows two adjacent pipe sections to form a curve since, by turning a third pipe section it is only possible to achieve a curve in an opposite or reflex sense. This may be of convenience, for example, where there is a kink in a pipeline which has to be lined.

Figure 6:
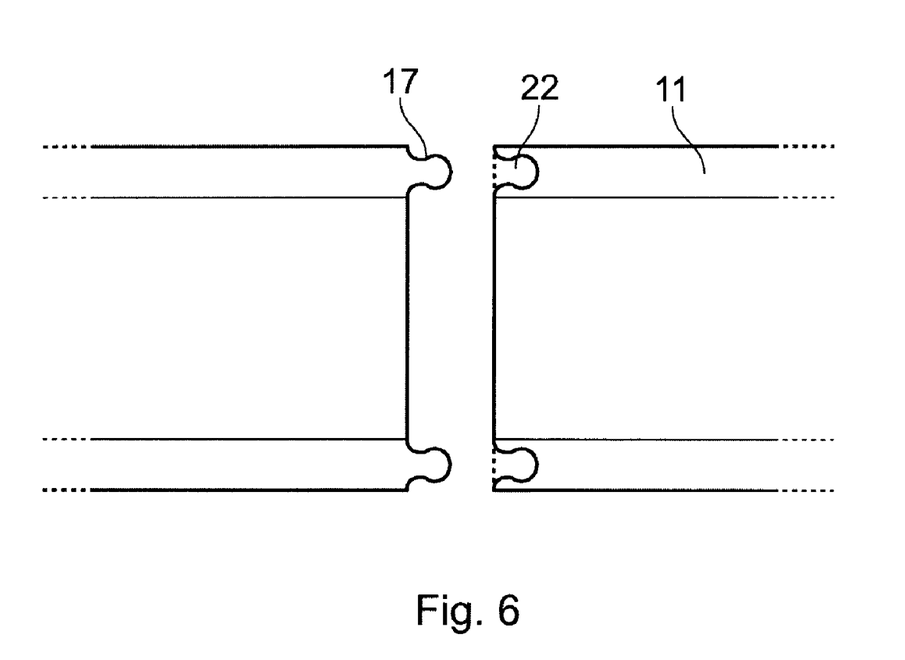
FIG. 6 is an enlarged sectional view of a part of a further embodiment of the invention.

FIG. 6 shows a further pipe section configuration having orthogonal end walls with snap-engaging ridge and groove corresponding to those of FIG. 3 and which, therefore, will not be described in detail herein. By providing orthogonal end walls the pipe sections of FIG. 6 can be snap-engaged together to allow relative axial forces both of compression and traction to be applied between the two adjacent sections. In this embodiment, of course, relative angular orientation about the longitudinal axis of each pipe section will not change the rectilinear configuration of the pipe assembly. For this reason pipe sections formed with this configuration may be rather longer than those illustrated in FIGS. 1 to 3, and the snap-engagement may be used simply as a means of interconnecting adjacent pipe sections end-to-end rather than as a means of achieving pipe bends.

Figure 7A:
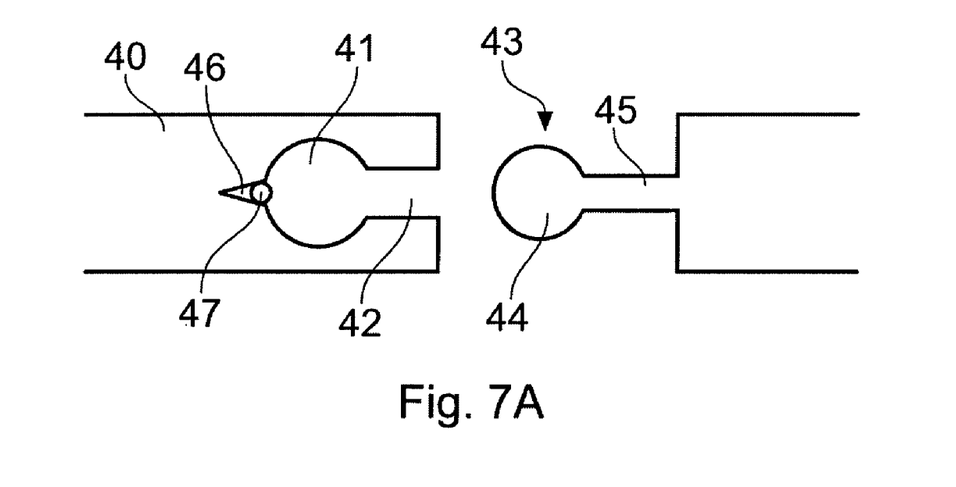
FIGS. 7A and 7B are respective enlarged sectional views of an improved sealing and engagement arrangement suitable for use with the pipe section of the invention.
Figure 7B:
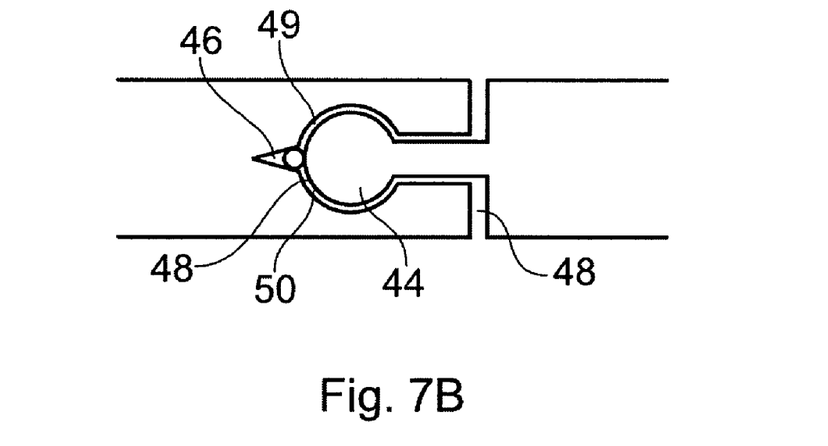

Because it is valuable to be able to provide a secure fluid-tight seal when two adjacent pipe sections are engaged together the arrangement of FIG. 7 may be utilised. This Figure shows, on an enlarged scale and in section the cooperating wall parts of two adjacent pipe sections, similar to those of FIG. 3. In FIG. 7, however, a pipe wall 40 has a groove 41 with a narrow neck 42 into which a correspondingly shaped ridge 43 with a mushroom head 44 and a narrow neck 45 can be snap-engaged. The circumferential ridge 43 may be in all respects identical to the ridge 17 in the arrangement of FIG. 3. The groove 41, however, differs in that it has a V-section channel 46 in the bottom part or fundus of the circular-section main portion 41 of the groove. In use a sealing ring 47 is fitted into the mouth of the V-section channel 46 and is retained in position by friction. Upon snap-engagement of the ridge 43 into the groove 41 sealing ring 47 is pressed more deeply into the V-section channel 46 and presses against the crown 47 of the mushroom head 44 with an interspace 49, 50 respectively on either side thereof. The inclination of the side walls of the V-section channel 46 assist in driving the sealing-ring 47 towards the mushroom head 44 so that whichever side of the wall experiences the higher pressure (for example, if the interior of the pipe is under pressure or the exterior of the pipe is under pressure) this pressure, entering the interspace 48 between the two wall portions urges the sealing ring 47 more tightly into the interspace 49 or 50 thereby increasing the sealing pressure and ensuring a firm seal.

Figure 8:
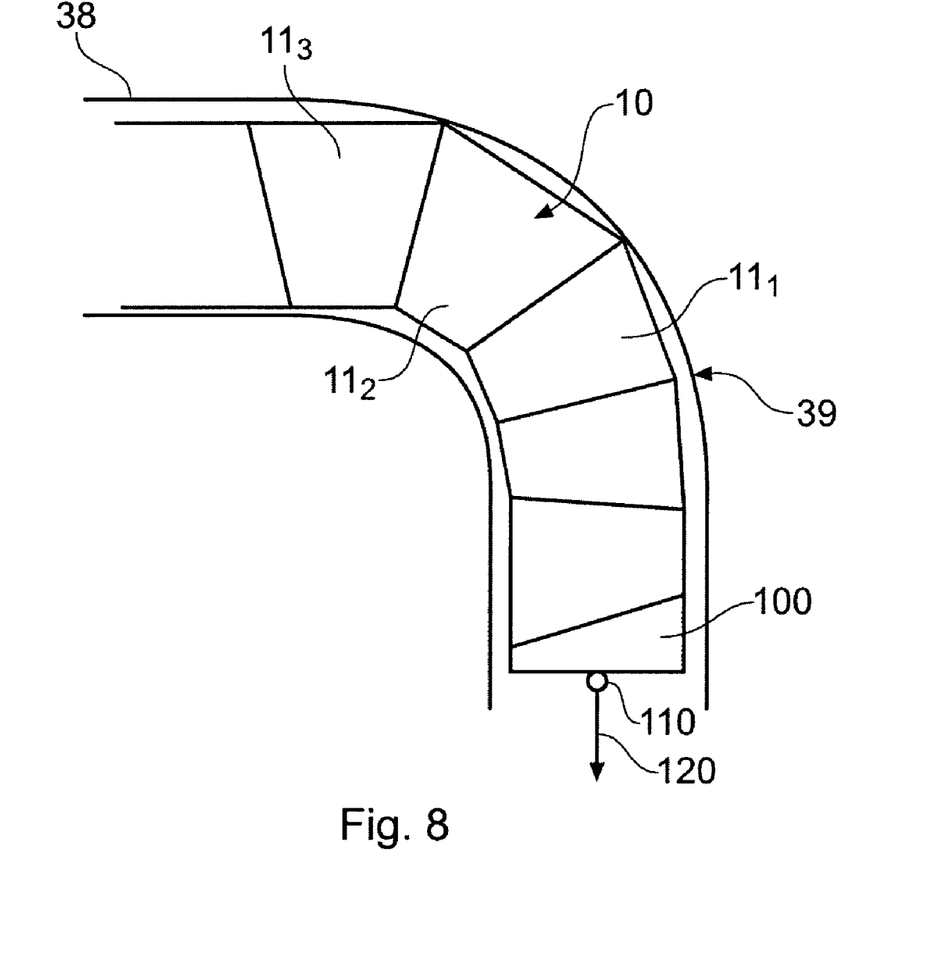
FIG. 8 is a detail of a hypothetical pre-existing pipe or passage having a bend or curve along its length and illustrates the manner in which a pipe assembly such as that illustrated in FIGS. 1 and 2 may be used.

In order to line a pre-existing pipe or passage, having a bend or curve along its length, a pipe assembly such as that illustrated in FIGS. 1 to 3 may be employed as illustrated in FIG. 8. Here, the right angle bend 39 in the pre-existing pipe is illustrated with an assembly of pipe sections 11 which have been introduced and advanced into the pipe 38.

A device 100 for providing a vibration to the pipe assembly 10 is attached to the lead section 11₄. This attachment may be achieved by employing the same means as is employed to connect adjacent pipe sections. Alternative methods are of course possible. A loop 110 is provided on the vibratory device 100 by which a draw line 120 may be attached. A force in the direction of the arrow, as shown in FIG. 8, can then be applied to pull the assembly 11 through the pre-existing pipe or passage.

When installing a pipe assembly into a pre-existing pipe or passage, whatever the angular orientation of the pipe sections 11 about their longitudinal axes X-X a point on the peripheral rim of the leading end of the leading pipe section 11₄ will eventually come into contact with the radially outermost wall of the pipe bend 39. When the advancing movement of the pipe assembly is arrested by this contact, it is possible, as described in earlier GB application No GB0612052.1, to turn the pipe assembly about the axis X-X. This is achieved in this invention by vibrating or oscillating the lead pipe section, while still applying a pulling force to it. This vibration, or oscillation, has two effects. The first is that the lead section will rotate about its longitudinal axis as it repeatedly contacts the wall of the pre-existing pipe or passage. This is because the rim of the section will naturally want to follow the path of least resistance. With a continual pulling force applied to it the pipe will cease rotating once it has reached a rotational position relative to the pre-existing pipe or passage where the minimum reaction forces are exerted between the pipe section and the wall of the pre-existing pipe or passage and in which the section may advance around the bend.

The second effect is that adjacent sections of the pipe will be moved axially towards and away each other due to a certain amount of tolerance provided in the connection means (mushroom head 18 and groove 22). This tolerance may be observed in FIG. 9, with adjacent sections 11₁ and 11₂ pressed together and in FIG. 10 with them pulled slightly apart such that a gap 130 is created therebetween. This repeated movement eases the rotation of the adjacent sections relative to one another since when the adjacent end walls are apart, as is shown in FIG. 10, the area of contact between the two is much less than when they are pressed together, as is shown in FIG. 9, and accordingly, there is less friction to impede the relative rotation.

In this orientation the longitudinal axes X-X, Y-Y of the two sections 11₁ and 11₂ are at an angle β (which is equivalent to 2α) to each other.

With reference to FIG. 8, when the section 11₁ has rotated into a position such that it can be, and is, advanced around the bend in the pre-existing pipe or passage the next section 11₂ will move into the same position as the section 11₁ had been when it first engaged the curved pipe wall 39. Further vibration of the assembly will allow this section to rotate relative to the other sections such that it can travel around the bend, and so on.

Figure 9:
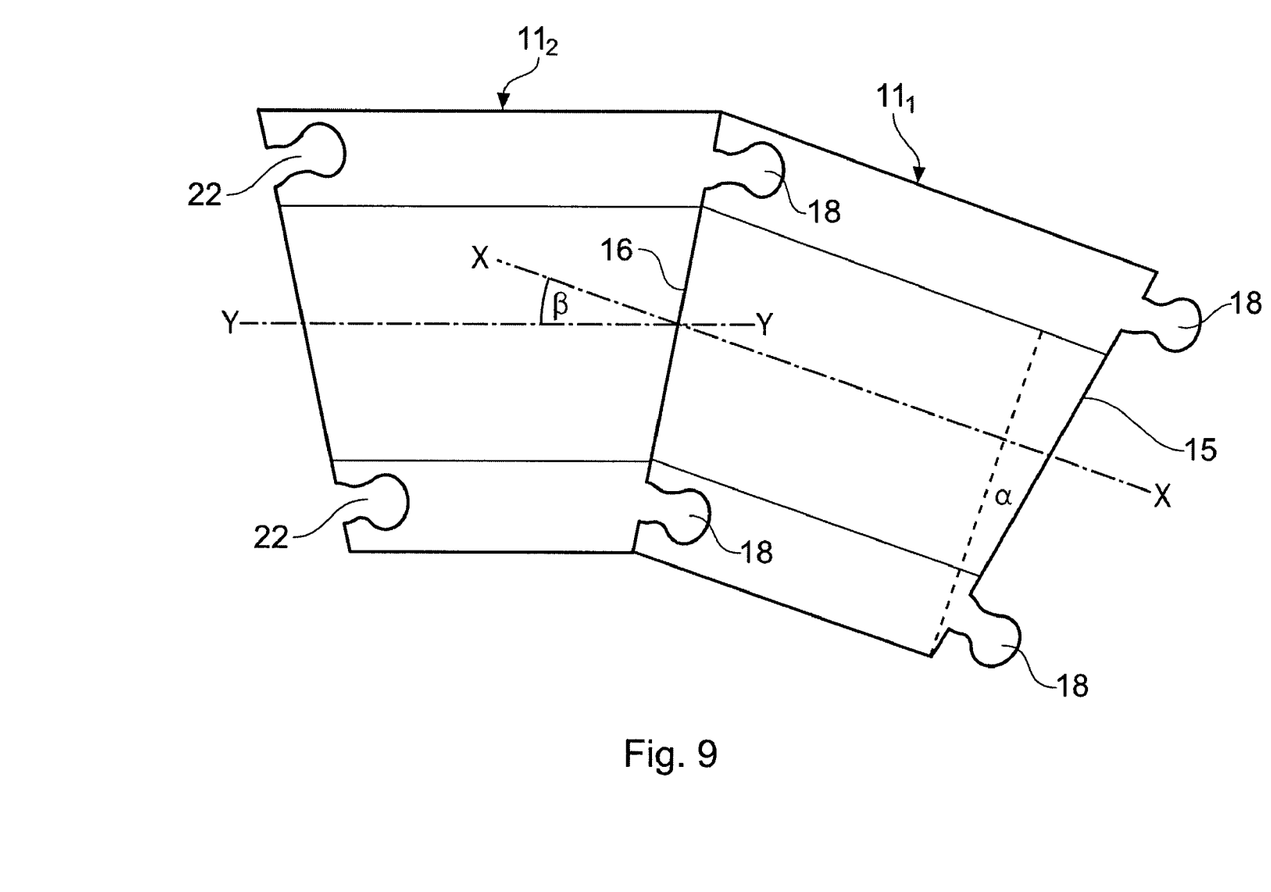
FIG. 9 is a view of the embodiment of FIG. 3 in a first configuration.
Figure 10:
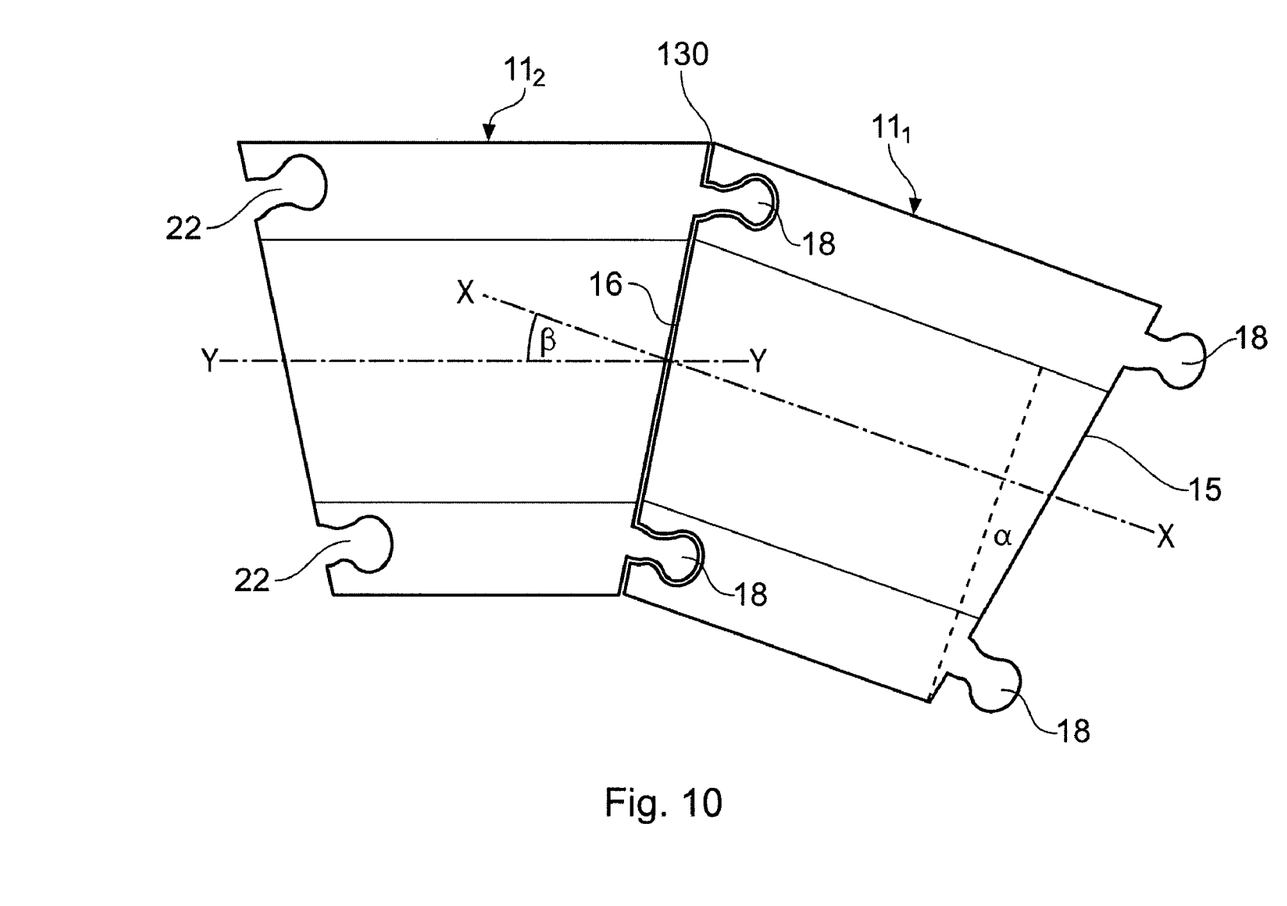
FIG. 10 is a view of the embodiment of FIG. 3 in a second configuration.

Each section has a longitudinal axis through the centre of the bore (indicated as X-X for section 11₁, and Y-Y for section 11₂ in FIGS. 9 and 10). As each section is advanced along the pre-existing pipe or passage its longitudinal axis will stay substantially parallel to the tangent of the radius of curvature, at the said point of the section, of the particular length of pre-existing pipe or passage in which it lies. Each section cannot advance along the pre-existing pipe or passage unless this occurs.

Since the radius of curvature of the pre-existing pipe or passage will almost certainly change along its length each section will have to rotate relative to the pre-existing pipe or passage and to the adjacent sections constantly as the assembly is advanced. To aid this continual rotation the vibration of the lead section of the pipe is propagated throughout the length of the assembly so that sections located a distance from the lead section are moved back and forth, towards and away from their neighbouring sections. It may be that if the assembly becomes too long the vibration will not travel through the entire length of the assembly. In this case additional and/or alternative vibration devices may be attached to sections of the pipe as they are advanced into the preexisting pipe or passage such that vibrations are produced at possibly more than one position along the length of the assembly. It is possible that each device may be operated so that the frequency of the vibrations created by each is synchronised with the others. This would ensure that each section of pipe was being pushed and pulled, relative to the pre-existing pipe or passage, at the same time. Of course, in some circumstances it may be desirable not to synchronise the various devices, or, if the length is long enough, it may not matter.

The form of vibration may be at a regular frequency. Alternatively, the frequency could vary in a predetermined or random manner. The vibration could be employed continuously while the assembly is advanced along the pre-existing pipe or passage or it could be used discontinuously, and only when necessary.

The device 100 for providing the vibrations may take the form of a simple mechanical apparatus powered by any suitable means such as hydraulic or pneumatic actuators, clockwork, or an electric motor and eccentric weight. Other possibilities such as a piezoelectric element, a pneumatically or hydraulically driven eccentric apparatus, or manual handling are all possible.

Figure 11:
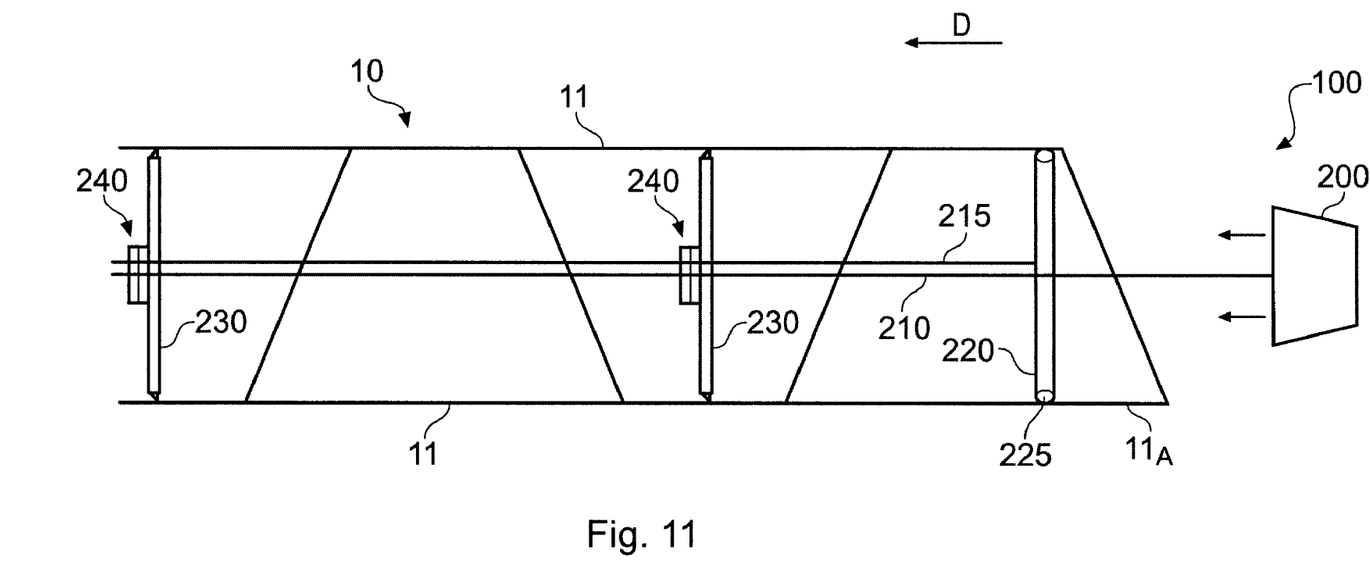
FIG. 11 schematically illustrates a pipe assembly such as that illustrated in FIGS. 1 and 2 in conjunction with a device according to a second embodiment for installing the pipe assembly into a pre-existing pipe or passage.

FIG. 11 illustrates a device, generally 100', installed in the pipe assembly 11, for advancing the pipe assembly 11 through a pre-existing pipe or passage. A terminator 200 is coupled with a hose 210 which, in turn, is coupled with a four cylinder compressor (not shown). Feedback amongst some of the compressor cylinders causes intermittent high pressure to be applied to a fluid, typically water, supplied via the hose 210 to the terminator 200. The terminator 200 has vents through which the fluid is emitted. The vents are arranged to direct the fluid generally along the longitudinal axis of leading pipe section 11₄. Emission of the fluid generates a reactive force on the terminator 200 along the longitudinal axis of the leading pipe section 11₄. The terminator 200 is connected via the hose 210 with a primary engaging disk 220, which engages with the leading pipe section 11₄. The longitudinal force experienced by the terminator 200 is exerted via the hose 210 and the primary engaging disk 220 onto the leading pipe section 11₄. It is beneficial to position the terminator 200 at a sufficient distance from the primary engaging disk 220 and to arrange the vents such that the fluid fails to impact on the primary engaging disk 220 since this would impart a force which was counter to the reactive force and inhibit movement of the pipe assembly 11.

Secondary engaging disks 230 are provided at positions aligned with the trailing pipe sections 11. The secondary engaging disks 230 connect with the hoses 210, 215 via a safety clutch (illustrated in more detail in FIG. 12). The longitudinal force experienced by the terminator 200 is exerted via the hoses 210, 215 and the secondary engaging disks 230 onto the trailing pipe sections 11. These forces pull and vibrate the pipe assembly through the pre-existing pipe or passage.

The primary engaging disk 220 is provided with a hydraulic seal 225 which is inflated using the hydraulic hose 215 once the primary engaging disk 220 has been initially inserted into the leading pipe section $11_A$ to retain the primary engaging disk 200 firmly in place under the longitudinal forces and vibrations it will experience.

Typically, a portion of pipe assembly 10 made of a number of pipe sections 11 is initially assembled and the device 100' is inserted at the leading pipe section $11_A$. The device 100' is pulled into the pipe assembly 10 using the hoses 210, 215. The bevelled-edge shape of a rubber seal 280 held between two plates 290, 300 (see FIG. 12) of the secondary engaging disks 230 facilitates sliding of the device 100' in the direction D, but resists movement in the opposite direction.

Once inserted and activated, the hoses 210, 215 may be rotated to assist the advancement of the pipe assembly. The rotation can either be by hand or by an automated arrangement. Typically, the hoses 210, 215 are rotated around 360 degrees in one direction and then counter-rotated 360 degrees in the other direction.

Figure 12:
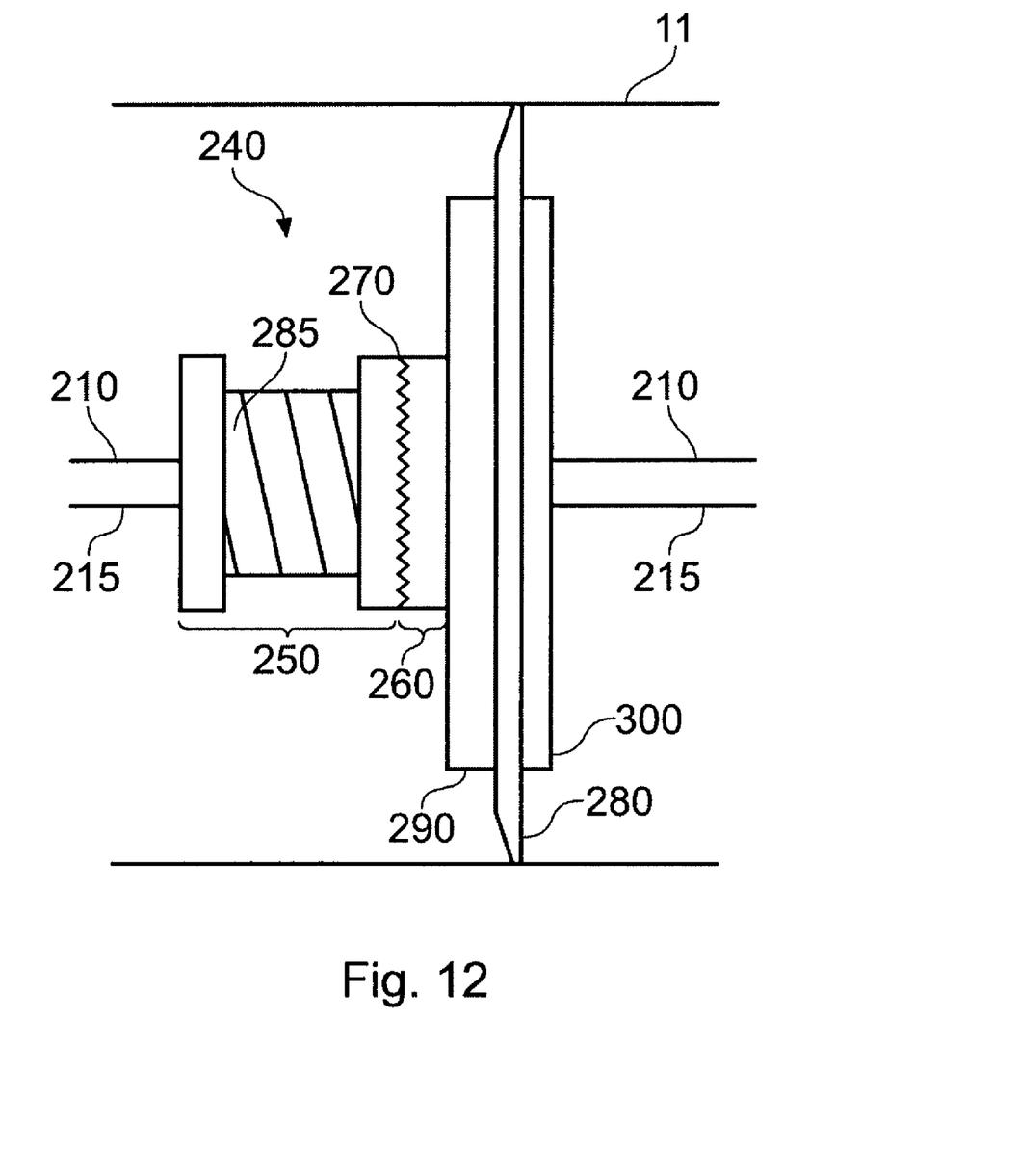
FIG. 12 illustrates in more detail a component of the device shown in FIG. 11.

As illustrated in more detail in FIG. 12, the hoses 210, 215 are connected with a first side 250 of the safety clutch 240. The first side 250 of the safety clutch 240 engages with a second side 260, with a wave-like radial structure on opposing faces 270 being urged together by a spring 285. Should the resistance of that pipe section to rotation caused by that pipe section snagging on the pre-existing pipe or passage exceed a predetermined value then the opposing faces 270 will overcome the basing force of the spring and the first side 250 of the safety clutch 240 will rotate relative to the second side 260. Accordingly, the hoses 210, 215 will continue to rotate even when a pipe section is unable to, which enables the rotation force to be continued to be applied to other pipe sections.

Once the pipe assembly has been inserted into place then the hydraulic seal 225 is deflated and the whole device 100' can simply be pulled by the hoses 210, 215 through the newly installed pipe assembly.

Hence, it can be seen that this arrangement provides a convenient way of advancing the pipe assembly through the pre-existing pipe or passage.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

The invention claimed is:

1. A pipe lining apparatus for use in lining a pre-existing pipe or passage having at least one curved section or bend along its length, comprising pipe sections having generally cylindrical walls having axial ends which are inclined at non-orthogonal angles with respect to the longitudinal axis thereof, and interengagement means provided at each axial end by which adjacent sections can be joined together, into a pipe assembly, and held against axial separation while allowing relative rotation therebetween about the respective longitudinal axes; means for vibrating at least one pipe section so that, in use, relative rotation of the pipe sections with respect to one another about their respective longitudinal axes is facilitated; and means for applying either a tensile or compressive force to the pipe assembly for advancing the assembly through the pre-existing pipe or passage.

2. The apparatus according to claim 1, wherein the said interengagement means are integrally formed as part of the body of each pipe section.

3. The apparatus according to claim 1 or 2, wherein the said interengagement means are shaped to snap-engage and retain the said adjacent pipe sections together by the resilience of the material of which the snap-engagement means are made.

4. The apparatus according to claim 3, wherein the said snap-engagement means are formed within the wall thickness of the pipe section itself.

5. The apparatus according to claim 1 or 2, wherein the opposite ends of each pipe section are inclined in the same direction with respect to the longitudinal axis of the pipe section.

6. The apparatus according to claim 5, wherein the opposite ends of each pipe section are inclined at the same angle with respect to the longitudinal axis of the pipe section but are oriented differently about the said axis.

7. The apparatus according to claim 1 or 2, wherein the opposite ends of each pipe section are inclined in opposite directions with respect to the longitudinal axis of the pipe section.

8. The apparatus according to claim 7, wherein the opposite ends of each pipe section are inclined at the same angle with respect to the longitudinal axis of the pipe section but are oriented differently about the said axis.

9. The apparatus according to claim 1 or 2, wherein the interengagement means comprise an annular groove or channel in one end of each pipe section and an annular bead or ridge at the other end, the groove or channel having a re-entrant form and the bead or ridge being joined to the body of the pipe section by an annular wall portion of lesser thickness than either the bead or ridge or the wall of the body of the pipe section, the groove or channel itself having a recess for receiving a sealing element.

10. The apparatus according to claim 9, wherein the cross sectional shape of the groove or channel and that of the bead or ridge is asymmetric in a plane parallel to the longitudinal axis of the pipe section.

11. The apparatus according to claim 9, wherein the sealing element is a compressible bead, strip or ring engageable in the said recess.

12. The apparatus according to claim 11, wherein the cross sectional shape of the groove or channel and that of the bead or ridge is asymmetric in a plane parallel to the longitudinal axis of the pipe section.

13. The apparatus according to claim 1 or 2, wherein the body of each pipe section is injection moulded from plastics material.

14. The apparatus according to claim 1 or 2, wherein the means for vibrating and the means for applying comprises a terminator coupled with a conduit operable to carry a fluid, the conduit being intermittently pressurized by the fluid and the terminator having vents operable to release the intermittently pressurized fluid in the direction of the longitudinal axis of the pipe sections.

15. The apparatus according to claim 14, wherein the pipe sections comprise a leading pipe section and trailing pipe sections, the leading pipe section advancing through the pre-existing pipe or passage, with the trailing pipe sections following, the means for vibrating and the means for applying being engagable with the leading pipe section to pull the pipe sections through the pre-existing pipe or passage.

16. The apparatus according to claim 15, wherein the conduit is rotatable and the means for vibrating and the means for applying comprises a plurality of discs, each disc being coupled with the conduit and each disc being engagable with a predetermined one of the trailing pipe sections to impart rotation of the conduit to that trailing pipe section.

17. The apparatus according to claim 16, where the conduit is coupled with each disc via a safety clutch, the safety clutch being operable to disengage rotation of the conduit from the trailing pipe section when greater than a predetermined resistance to the rotation of that trailing pipe section is encountered.

* * * * *